(12) United States Patent
Stimple et al.

(10) Patent No.: US 6,373,563 B1
(45) Date of Patent: Apr. 16, 2002

(54) POLARIZATION RANDOMIZED OPTICAL SOURCE HAVING SHORT COHERENCE LENGTH

(75) Inventors: James R. Stimple; Kenneth R. Wildnauer, both of Santa Rosa, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/438,441

(22) Filed: Nov. 12, 1999

(51) Int. Cl.⁷ .............................................. G01N 21/21
(52) U.S. Cl. ....................................... 356/73.1; 372/26
(58) Field of Search ............................. 356/73.1; 372/6, 372/26

(56) References Cited

U.S. PATENT DOCUMENTS

| | | | | |
|---|---|---|---|---|
| 3,661,533 A | * | 5/1972 | David | 23/254 R |
| 5,619,320 A | * | 4/1997 | Eiselt | 356/73.1 |
| 5,694,114 A | * | 12/1997 | Udd | 340/506 |

OTHER PUBLICATIONS

Olivier Plomteux—"Tunable Laser Sources Characterize Passive Components", Supplement to Laser Focus World, vol. 35; Sep. 1999, pp. 27–30.

* cited by examiner

Primary Examiner—James W. Davie
Assistant Examiner—Gioacchino Inzirillo
(74) Attorney, Agent, or Firm—John L. Imperato

(57) ABSTRACT

An optical source generates optical signals as a result of varying polarization states to achieve oscillation within an optical loop. The optical signals have narrow spectral width and the optical source is tuneable, so that optical components stimulated by the optical signals can be characterized over a predefined wavelength range with high wavelength resolution. The optical loop includes an optical gain element, a tuneable filter, and a polarization scrambler that provides a varying polarization transfer function. The optical gain element has sufficiently high gain within the passband of the tuneable filter and the polarization transfer function is sufficiently varied to attain oscillation within the optical loop, thereby generating the optical signals. The varying polarization transfer function of the polarization scrambler produces a corresponding variation in the polarization of the generated optical signals, which are coupled from the optical loop to an output.

21 Claims, 2 Drawing Sheets

POLARIZATION RANDOMIZED OPTICAL SOURCE HAVING SHORT COHERENCE LENGTH

BACKGROUND OF THE INVENTION

The reduction in channel spacing within DWDM (dense wavelength division multiplexed) systems means that optical components used in the systems need to be characterized with ever-increasing wavelength resolution. One technique for characterizing an optical component provides stimulation to the component with a narrowband optical source, such as a tuneable laser. The response characteristics of the component to the stimulation are then measured with a broadband detector, such as an optical power meter. By tuning the optical source in fine wavelength increments, a characterization with a corresponding wavelength resolution is achieved over a wavelength range of interest. Wavelength resolution, however, is limited by the wavelength accuracy with which the fine wavelength increments can be tuned. In presently available tuneable lasers, wavelength inaccuracies can be large enough to make the tuneable lasers unsuitable for characterizing the optical components used in DWDM systems that have narrow channel spacing. In addition, these tuneable lasers have coherence lengths that are longer than needed to accurately characterize the optical components, making the measurement set-ups used in the characterization unnecessarily sensitive to optical reflections.

An optical source with improved wavelength accuracy and shorter coherence length described by Olivier Plomteux in the September 1999 supplement of Laser Focus World, Vol. 35, is well-suited for characterizing optical components used within DWDM systems. This optical source includes a fiber loop having an erbium doped fiber amplifier, a polarizer, a polarization controller, and a rotating dielectric filter, to provide high wavelength resolution over a wavelength tuning range of 1530–1570 nanometers. The polarized stimulus signal provided by this optical source relies on maintaining designated polarization states at each optical wavelength within the fiber loop so that conditions sufficient for oscillation are met over the wavelength tuning range.. Because polarization states of the components within the fiber loop are effected by aging, fiber movement, and other factors, periodic calibration is required to maintain the designated polarization states and compensate for the factors that effect polarization. Periodic calibration ensures that conditions for oscillation are met and that accurate wavelength tuning of the optical signal is achieved.

There is a need for an optical source that does not rely on maintaining designated polarization states to achieve oscillation, and that has sufficiently high wavelength resolution and short enough coherence length to stimulate optical components, such as those included in DWDM systems, so the components can be accurately characterized.

SUMMARY OF THE INVENTION

In an optical source constructed according to the preferred embodiment of the present invention, optical signals are generated as a result of varying polarization states within an optical loop to achieve oscillation. The optical signals have narrow spectral width and the optical source is tuneable, so that optical components stimulated by the optical signals can be characterized over a predefined wavelength range with high wavelength resolution. The optical loop includes an optical gain element, a tuneable filter and a polarization scrambler that provides a varying polarization transfer function. To attain oscillation within the optical loop, and thereby generate the optical signals, the optical gain element has sufficiently high gain within the passband of the tuneable filter and the polarization transfer function is sufficiently varied. Variation in relative delays between principle polarization states introduced by the polarization scrambler ensure that the condition for oscillation within the optical loop are met, even in the presence of factors that effect polarization. This varying polarization transfer function of the polarization scrambler produces a corresponding variation of the polarization of the generated optical signals, which are coupled from the loop to an output. Alternatively, the varying polarization transfer function is achieved by introducing wavelength-dependent polarization variations within the optical loop. When the polarization transfer function is varied in a random fashion, the polarization of the output signals becomes correspondingly randomized. A detector is optionally included with the optical source enabling transmission properties, reflection properties and other performance parameters of optical components to be characterized based on the detected response of the optical components to stimulation provided by the optical source at designated optical wavelengths.

DETAILED DESCRIPTION OF THE PREFERRED EMBODIMENT

Figure 1:
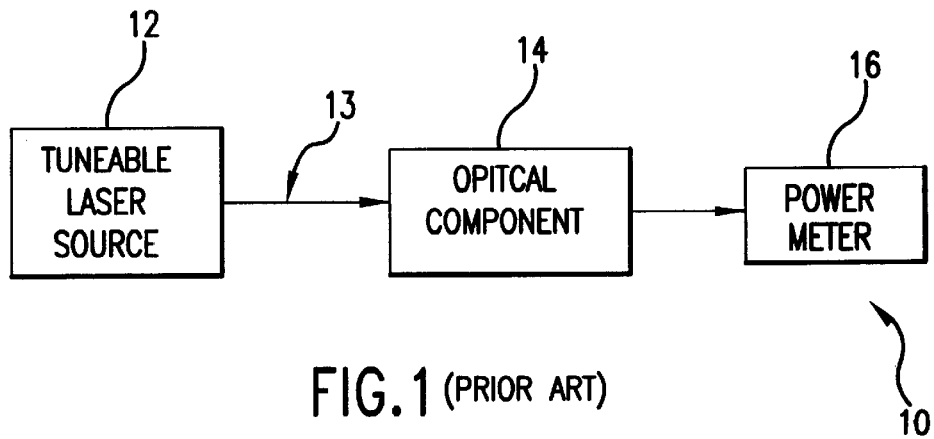
FIG. 1 shows a prior art system for characterizing optical components.

FIG. 1 shows a prior art system 10 for characterizing optical components 14. The system 10 shown is for characterizing transmission properties of an optical component 14 under test, but the system 10 is reconfigurable so that reflection properties and polarization-dependent loss can be characterized. A tuneable laser source 12 in the system generates an optical signal 13 that stimulates the optical component 14. The response characteristic of the optical component 14 to the applied optical signal 13 is detected by an optical power meter 16. The optical signal 13 is tuned across a designated wavelength range and the optical component 14 is characterized at each wavelength of interest within the wavelength range. Wavelength resolution of the characterization is limited by the accuracy with which the wavelength of the optical signal 13 can be adjusted. Uncertainty in the wavelength of the optical signal 13 can be large enough to make the wavelength resolution of the tuneable laser source 12 too low for characterizing optical components 14, such as those used in dense wavelength division multiplexed (DWDM) systems that have narrow channel spacing. In addition, tuneable laser sources 12 typically have coherence lengths that are longer than needed to accurately characterize the optical components 14, making the system 10 unnecessarily sensitive to optical reflections.

Figure 2:
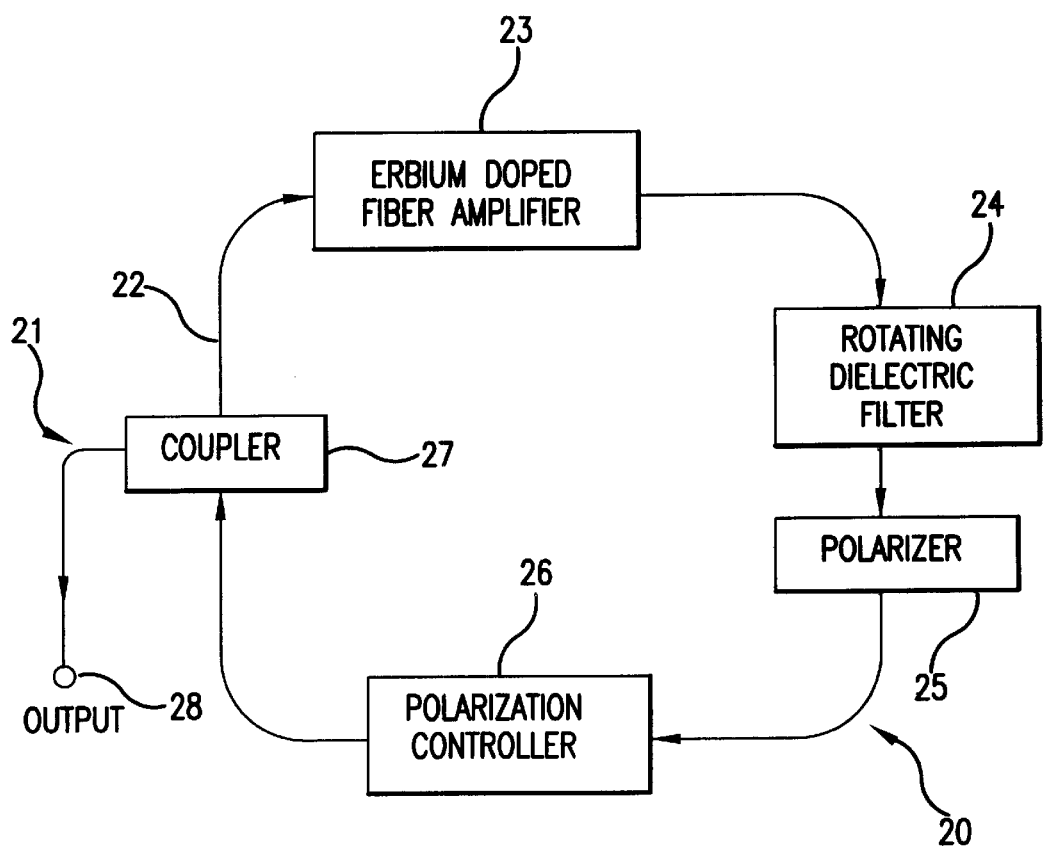
FIG. 2 shows a prior art polarized optical source including a fiber loop.

FIG. 2 shows a prior art polarized optical source 20 having improved wavelength accuracy and shorter coherence length than the tuneable laser source 12 shown in FIG. 1. The polarized optical source 20 produces optical signals 21 that have sufficiently high wavelength resolution to characterize optical components (not shown), such as those used within DWDM systems having narrow channel spacing. The optical signal 21 is provided at an output 28 coupled from a fiber loop 22 formed from an erbium doped fiber amplifier 23, a rotating dielectric filter 24, a polarizer 25, and a polarization controller 26. The erbium doped fiber amplifier 23 provides optical gain within the fiber loop 22 and the rotating dielectric filter 24 enables tuning of the wavelength of the optical signal 21 over a predefined wavelength range.

The polarizer 25 polarizes the optical signals within the fiber loop 22. The polarization controller 26 then designates the specific polarization states within the fiber loop 22, as required to meet the conditions for oscillation around the fiber loop 22 at each wavelength of the optical signal 21 within the wavelength range.

The polarization controller 26 is adjusted for each angle of rotation of the rotating dielectric filter 24. Accurately maintaining these designated polarization states at each angle of rotation is relied upon to achieve oscillation. The designated polarization states are accurately maintained through periodic calibration of the polarization controller 26, rotating dielectric filter 24 and other elements of the fiber loop 22. This calibration not only ensures that conditions for oscillation are met within the fiber loop 22, but enables accurate wavelength adjustment and repeatable power levels to be obtained in the optical signal 21 that is coupled to the output 28 by an optical coupler 27.

Figure 3:
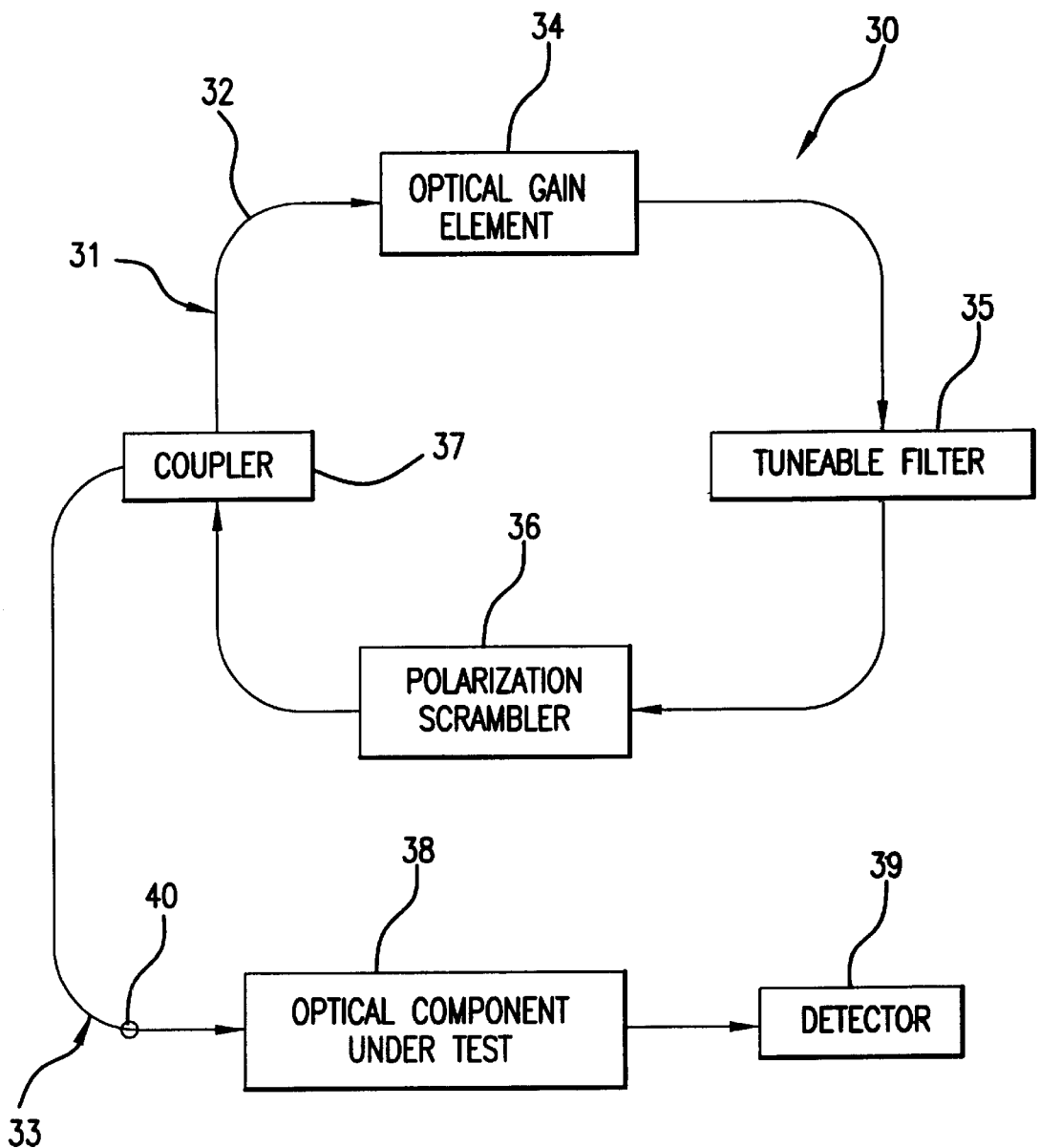
FIG. 3 shows an optical source constructed according to the preferred embodiment of the present invention.

FIG. 3 shows an optical source 30 constructed according to the preferred embodiment of the present invention. Optical signals 31, 33 provided by the optical source 30 are unpolarized, have narrow spectral width, and are tuneable with high wavelength resolution over a predefined wavelength range. The optical source 30 includes an optical loop 32 in which an optical gain element 34, a tuneable filter 35, and a polarization scrambler 36 are coupled. These elements are coupled within the optical loop 32 via optical fiber, or open optical beams that are directed between components, or the elements are coupled by a combination of optical fiber and open beams.

The optical gain element 34 is a fiber amplifier such as an erbium doped fiber amplifier, a semiconductor optical amplifier, or other device that provides optical gain over the predefined wavelength range. An example of a suitable optical gain element 34 is the FA18UFAC model erbium doped fiber amplifier, available from NORTEL Corporation, Paignton, England, which provides at least 30 dB of unsaturated optical gain over the 1530–1570 nanometer wavelength range.

The tuneable filter 35 is an interference filter, tuneable monochromator or other type of wavelength selective device or system having a passband that is tuneable over the wavelength range of interest and that passes optical signals within the spectral width. A spectral width of 300 MHz for the optical signals 31, 33, for example, provides a short enough coherence length to avoid unnecessary sensitivity to optical reflections when the optical source 30 is included in measurement systems for characterizing optical components. An example of the tuneable filter 36 is a tuneable bandpass filter having a 3 dB bandwidth of 60 picometers and a tuning range of 1530–1570 nanometers.

The polarization scrambler 36 provides a varying polarization transfer function. The varying polarization transfer function results from introducing variations in relative delays between principle polarization states within the polarization scrambler 36 as a function of time. Alternatively, the varying polarization transfer function results from introducing wavelength-dependent polarization variations, or from introducing a combination of variations in relative delays between principle polarization states as a function of time and wavelength-dependent polarization variations within the polarization scrambler. An example of a suitable polarization scrambler 36 is the PS 155A Polarization Scrambler available from FiberPro Donam Systems, Inc., in Taejon, Korea.

The gain element 34 has sufficiently high optical gain over the predefined wavelength range and the polarization transfer function is sufficiently varied by the polarization scrambler 36 to meet conditions for oscillation within the optical loop 32 so that the optical signals 31 are generated within the passband of the tuneable filter 35. The variations of polarization states introduced by the polarization scrambler 36 result in a corresponding variation in the polarization of optical signals 31 within the optical loop 32. When the polarization transfer function is varied in a random fashion, the polarization of the output signals becomes correspondingly randomized. These polarization-varied optical signals 31 are coupled from the optical loop by an optical coupler 37 to an output 40. When a polarized optical signal, rather than a polarization-varied signal is preferred at the output 40, a polarizer (not shown) is included at the output 40, for example interposed between the output 40 and an optical component under test 38.

A detector 39 is optionally included in the optical source 30 enabling transmission properties, reflection properties and other performance parameters of an optical component under test 38 to be characterized by detecting the responses of the optical component 38 to stimulation provided by the optical source 30 at designated optical wavelengths. Synchronized detection and wavelength tuning can be achieved by using the tuneable filter 35 and detector 39 present in an optical spectrum analyzer, such as the HP71451B, option E16 optical spectrum analyzer available from AGILENT TECHNOLOGIES, California.

While the preferred embodiment of the present invention has been illustrated in detail, it should be apparent that modifications and adaptations to this embodiment may occur to one skilled in the art without departing from the scope of the present invention as set forth in the following claims.

What is claimed is:

1. An optical source for producing optical signals having a predefined spectral width and tuneable over a predefined wavelength range, comprising:
   an optical gain element,
   a filter having a tuneable passband, passing signals within the spectral width and tuneable over the predefined wavelength range; and
   a polarization scrambler providing a varying polarization transfer function, wherein the optical gain element, filter and polarization scrambler are coupled in an optical loop, the optical gain element having sufficiently high gain within the tuneable passband of the filter and the polarization transfer function sufficiently varied to attain oscillation within the optical loop to generate the optical signals having polarization corresponding to the varying polarization transfer function.

2. The optical source of claim 1 wherein the polarization scrambler includes principal polarization states and relative propagation delay between the principal polarization states is time-varied to provide the varying polarization transfer function.

3. The optical source of claim 1 further comprising an optical coupler within the optical loop, coupling the optical signals from the optical loop to an output.

4. The optical source of claim 3 further comprising a polarizer coupled to the output, polarizing the optical signals externally to the optical loop.

5. The optical source of claim 1 wherein the optical gain element includes a fiber amplifier.

6. The optical source of claim 2 wherein the optical gain element includes a fiber amplifier.

7. The optical source of claim 5 wherein optical fiber provides coupling of the optical gain element, the filter and the polarization scrambler within the optical loop.

8. The optical source of claim 6 wherein optical fiber provides coupling of the optical gain element, the filter and the polarization scrambler within the optical loop.

9. The optical source of claim 5 wherein the fiber amplifier is an erbium doped fiber amplifier.

10. The optical source;of claim 1 wherein the filter is a tuneable interference filter.

11. The optical source of claim 2 wherein the filter is a tuneable interference filter.

12. The optical source of claim 1 wherein the filter is a tuneable monochromator.

13. The optical source of claim 2 wherein the filter is a tuneable monochromator.

14. An optical source for producing optical signals having a predefined spectral width and tuneable over a predefined wavelength range for stimulating an optical component under test, comprising:

an optical gain element, a filter having a tuneable passband, passing signals within the spectral width and tuneable over the predefined wavelength range;

a polarization scrambler providing a varying polarization transfer function, wherein the optical gain element, filter and polarization scrambler are coupled in an optical loop, the optical gain element having sufficiently high gain within the tuneable passband of the filter and the polarization transfer function sufficiently varied to attain oscillation within the optical loop to generate the optical signals having polarization corresponding to the varying polarization transfer function;

an optical coupler within the optical loop, coupling the optical signals from the optical loop to the optical component under test; and a detector characterizing responses of the optical component under test to the stimulus provided by the optical signals.

15. The optical source of claim 14 wherein the polarization scrambler includes principal polarization states and relative propagation delay between the principal polarization states is time-varied to provide the varying polarization transfer function.

16. The optical source of claim 14 wherein the fiber amplifier is an erbium doped fiber amplifier.

17. The optical source of claim 14 wherein the filter is a tuneable interference filter.

18. The optical source of claim 15 wherein the filter is a tuneable monochromator.

19. The optical source of claim 14 wherein the detector and the filter are included in an optical spectrum analyzer.

20. A method for producing within an optical loop, optical signals having a predefined spectral width and tuneable over a predefined wavelength range, comprising the steps of:

providing optical gain within the optical loop;

filtering within the optical loop, an optical passband that is tuneable within the spectral width and tuneable over the predefined wavelength range; and varying polarization within the optical loop to attain oscillation within the optical loop to generate the optical signals.

21. The method of claim 20 wherein the step of varying polarization includes varying relative propagation delay between principal polarization states within the optical loop, producing a corresponding variation in polarization of the optical signals.

* * * * *